US012777100B2

(12) United States Patent
Chen et al.

(10) Patent No.: US 12,777,100 B2
(45) Date of Patent: Oct. 27, 2026

(54) SYSTEM AND METHODS FOR INTEGRATING MICROSERVICE REGISTRY WITH SERVICE MESH

(71) Applicant: HUAWEI CLOUD COMPUTING TECHNOLOGIES CO., LTD., Gui Zhou Province (CN)

(72) Inventors: Ming Chen, Kanata (CA); Jun Gan, Kanata (CA); Adalberto Ribeiro Sampaio Junior, Kanata (CA); Jieshui Mo, Kanata (CA); Shiqi Wang, Kanata (CA)

(73) Assignee: HUAWEI CLOUD COMPUTING TECHNOLOGIES CO., LTD., Guizhou Province (CN)

( * ) Notice: Subject to any disclaimer, the term of this patent is extended or adjusted under 35 U.S.C. 154(b) by 49 days.

(21) Appl. No.: 19/053,797

(22) Filed: Feb. 14, 2025

(65) Prior Publication Data

US 2025/0193289 A1 Jun. 12, 2025

Related U.S. Application Data

(63) Continuation of application No. PCT/CN2022/131723, filed on Nov. 14, 2022.

(51) Int. Cl.

*H04L 67/51* (2022.01)
*H04L 61/4541* (2022.01)
*H04L 67/10* (2022.01)
*H04L 67/565* (2022.01)

(52) U.S. Cl.

CPC .......... *H04L 67/51* (2022.05); *H04L 61/4541* (2022.05); *H04L 67/10* (2013.01); *H04L 67/565* (2022.05)

(58) Field of Classification Search

CPC ..... H04L 67/51; H04L 61/4541; H04L 67/10; H04L 67/565

See application file for complete search history.

(56) References Cited

U.S. PATENT DOCUMENTS

| | | | | |
|---|---|---|---|---|
| 10,764,244 | B1 | 9/2020 | Mestery et al. | |
| 11,457,080 | B1 * | 9/2022 | Meduri | H04L 67/60 |
| 12,255,875 | B2 * | 3/2025 | Lenrow | G06F 9/45558 |
| 2022/0109741 | A1 | 4/2022 | Chen et al. | |
| 2023/0205752 | A1 * | 6/2023 | Singhal | G06F 9/4881 707/812 |
| 2025/0045046 | A1 * | 2/2025 | Shpilyuck | G06F 8/72 |
| 2025/0220088 | A1 * | 7/2025 | Ding | H04L 67/562 |

FOREIGN PATENT DOCUMENTS

| | | |
|---|---|---|
| CN | 111209127 A | 5/2020 |
| CN | 114237704 A | 3/2022 |
| CN | 114615320 A | 6/2022 |

OTHER PUBLICATIONS

Xi Ning Wang, "Architecture Analysis of Istio:The Most Popular Service Mesh Project—Alibaba Cloud Community", Dec. 16, 2020.

* cited by examiner

*Primary Examiner* — Shirley X Zhang

(57) ABSTRACT

This is a method and a system for integrating a cloud service engine framework with an open source service mesh (e.g. ISTIO) to bridge communication barriers between the two systems. The disclosure may enable users to adopt iterative cloud modernization model by embracing hybrid microservice architecture. Adoption of a multi-cloud architecture may also help to cut expenses due to small resources footprint of proxy less feature.

15 Claims, 10 Drawing Sheets

```
When the sync controller receives a governance request from service mesh
    If there are RouteRules in the service registry config store
        Range RouteRules
            Decode the RouteRule and get the Service Name from RouteRule
            If there is a Microservice with same name in the registry
                Create a DestinationRule with this Service Name
              Extract service address,  ports and versions from this Microservice and its Instance and construct to destinations, and insert
                to the DestinationRule.
                Create a Virtual Service for each destination of the DestinationRule
                If the RouteRule specify http header matching
                    Convert the header matching section to VirtualService match.header section
                Else if the RouteRule specify instance version matching
                    Convert the version matching section to VirtualService subset section
                Convert the weight in DestinationRule to the weight in VirtualService
            Else
                Continue
    Else
        process other governance polices
```

FIG. 6

```
When the sync controller sends a governance request from service mesh
    If there are RDS configs in the response from service mesh
        Filter out system default configs by name and name space
        Range RDS configs
            Decode the RDS config and get virtual hosts
            Extract virtual host service name and service name space from virtual host name
            Create a Service Registry RouteRule with this service name
            If there is routes.match configuration in the virtual host
                Set match configuration to RouteRule
            Extract the route configs from the virtual host
            Range route configs
                Extract service address, port, weight and version
                Construct a Route Config and set it to the RouteRule struct
    Else
        process other governance polices
```

FIG. 8

SYSTEM AND METHODS FOR INTEGRATING MICROSERVICE REGISTRY WITH SERVICE MESH

CROSS-REFERENCE TO RELATED APPLICATIONS

This application is a continuation of International Patent Application No. PCT/CN2022/131723, filed on Nov. 14, 2022, and titled "System and Methods for Integrating Microservice Registry with Service Mesh" the content of which is incorporated herein by reference in its entirety.

TECHNICAL FIELD

The invention relates to the technical field of cloud computing, and in particular to a method and a system for integrating a cloud service engine framework with an open source application service mesh to obviate or mitigate communication barriers between the two systems.

BACKGROUND

In a conventional cloud service engine (CSE) system, services (microservices or microservice instances) are managed through a service registry (SR) stack. The term "microservice" refers to a software service which may be used for building a distributed application using containers. Microservices may have different kinds of connectivity: public IPv4, private IPv4, globally reachable IPv6, etc.

An alternative to the SR is an application service mesh (SM), for example, ISTIO. The SM is a dedicated infrastructure layer that may be added to applications running microservice instances in a cloud, and may be used for controlling inter-microservice communication. The SM enables an application developer to transparently add capabilities such as observability, traffic management, and security, without incorporating them into the application code.

The SM is typically implemented as a scalable set of network proxies deployed alongside an application code (a pattern sometimes called a sidecar). These proxies handle the communication between microservices. The service mesh control plane may be deployed into an application platform (for example, K8s platform). The service mesh control plane, if deployed into an application platform, may reuse the application platform service registry and its discovery mechanism.

A Service Registry may include a database populated with information on how to dispatch discovery requests, and how to dispatch governance policies to microservices instances. The database may be used for registering microservice applications and related data. Governance policies may rely on metadata registered into a SR (or a SM) to control communication rules, such as messaging routing, and communication resiliency, such as circuit-breaker or a rate limit.

Service discovery is a mechanism for keeping track of available instances of a cloud application and distributing requests across available instances. XDS is a universal protocol for resources discovery between a control plane and a data plane. A controller operating at least in part as an XDS based server may be implemented to ensure dynamic delivery of updates on new resources to a subscriber.

Conventional solutions can enable application services running in the SM to discover services running in the SR stack. However, service discovery in the opposite direction is not available. The conventional solutions also do not operate to synchronize service governance policies due to semantic gaps in the synchronization protocol between the service mesh and the service registry. Furthermore, the conventional solutions may support service deployment to only one stack (i.e., a SR or a SM).

Therefore, there is a need for systems and methods which obviate or mitigate one or more limitations of the prior art.

The background information provided here is believed by the applicant to be of relevance to the present disclosure. No admission is necessarily intended, nor should be construed, that any of the preceding information constitutes prior art against the present invention.

SUMMARY

Cloud computing customers, for example application modernization customers who are considering migrating their microservices from a conventional service registry to a service mesh, will require solutions capable to obviate or mitigate communication barrier between these two heterogeneous tech stacks caused by the different discovery and registration mechanisms. To facilitate modernization of microservice applications, embodiments of this disclosure provide for integration of a SR and a SM in a such way that the microservice applications, registered into the SR can be discoverable by the SM, and vice-versa. Furthermore, governance policies, registered into the SM, may be synchronized to the SR, and vice-versa.

Embodiments of the present disclosure are directed to a method, a system, and a device enabling bidirectional service discovery between a SR of a cloud service engine (e.g., CSE) and an application SM (e.g. ISTIO). Bidirectional service discovery between SR and SM systems allows to avoid duplicated configurations of governance policies and enable application services functionality in a hybrid architecture. The SR and SM can then be operated concurrently in a coordinated manner. Embodiments of the present disclosure enable cloud computing customers to implement iterative cloud modernization models for migration to new applications in traditional industries such as banking, public sectors, etc., facilitate multi-cloud architecture (of cloud service engines) and compatibility with leading service mesh products, for example ISTIO, which may lead to a higher competitiveness.

An object of embodiments of the present disclosure is to provide systems and methods for integrating microservice registry and service mesh technologies, for example to facilitate iterative cloud modernization. In various aspects, a service mesh is provided with registry information regarding services registered to a service registry, and the service registry is provided with mesh information regarding services registered to the service mesh. The registry information is originally in a format not readable by the service mesh infrastructure, but is converted into a format readable by the service mesh infrastructure. The mesh information is originally in a format not readable by the service registry infrastructure, but is converted into a format readable by the service registry infrastructure.

According to embodiments of the present disclosure, a controller may receive a first discovery request from a service mesh, where the service mesh may be implemented using a scalable set of network proxies deployed alongside application code operative to provide microservice instances. The controller may be operatively coupled to a service registry. The controller obtains from the service registry, service registration information which is indicative of names and locations of services registered to the service registry. The service registry may comprise a database populated with information indicative of how and where to dispatch service requests for fulfilment by further microservice instances.

In response to the first discovery request, the controller may provide converted data to the service mesh. The converted data may comprise the registry data in a format supported by the service mesh. The registry data may comprise all registration metadata held in the service registry for said services registered in the service registry.

The controller may also send a second discovery request to the service mesh and receive a response to the second discovery request from the service mesh. The response may be indicative of mesh data comprising further names and locations of services registered to the service mesh. Subsequently to receiving the response, an update to the service registry may be initiated. The update may include providing, to the service registry, second converted data. The second converted data may include the mesh data in a format supported by the service registry. Additionally, or alternatively, the service registry may be updated in accordance with the semantics of the mesh data. Furthermore, the controller may convert the registry data to the converted data, or convert the mesh data to the second converted data, or both. Alternatively, the controller may direct or interoperate with other computing resources to perform such conversion.

According to some embodiments, the controller may operate at least in part as an XDS-based server receiving the first discovery request and providing the converted data in response to the first discovery request. The converted data may include all registration metadata held in the service registry for services registered thereto. The controller may additionally or alternatively operate at least in part as an XDS-based synchronization client sending the second discovery request and receiving the response to the second discovery request. The controller may repeatedly perform operations of sending the second discovery request, receiving the response to the second discovery request, and initiating the update to the service registry.

Some embodiments of the present disclosure are directed to a controller obtaining governance policies from a service registry, a service mesh, or both, and providing translated versions of the governance policies from a service registry to a service mesh, from a service mesh to a service registry, or both. Such embodiments may be combined with the above-described embodiments or provided separately. First such governance policies may be indicative of microservice configurations stored by the service registry for use in governing microservice operations. The service registry may comprise a database populated with information indicative of how and where to dispatch service requests for fulfilment by microservice instances. The controller may provide first converted governance policies to a service mesh. The first converted governance policies may comprise the first governance policies in a format supported by the service mesh, where the service mesh is implemented using a scalable set of network proxies deployed alongside application code operative to provide further microservice instances. The controller may also send a governance policy request to the service mesh and receive a response to the governance policy request from the service mesh. The governance policy request may be a request for second governance policies held by the service mesh for use in governing operations of the further microservice instances. The response may be an indicative of the second governance policies.

Subsequently to receiving the response, the controller may initiate an update to the service registry. The update may include providing, to the service registry, second converted governance policies. The second converted governance policies may include the second governance policies in a format readable by the service registry.

In some embodiments of the present disclosure the format supported by the service mesh may be a service mesh governance data model.

In some embodiments of the present disclosure, the controller may operate at least in part as an XDS-based server providing the first converted governance policies to the service mesh. Additionally or alternatively the controller may operate at least in part as an XDS-based synchronization client sending the governance policy request and receiving the response to the governance policy request.

The controller may repeatedly perform the operations of: sending the governance policy request, receiving the response to the governance policy request, and initiating the update to the service registry.

In some embodiments of the current disclosure the controller may convert the first governance policies from the service registry to the first converted governance policies readable by the service mesh, or convert the second governance policies from the service mesh to the second converted governance policies readable by the service registry, or both.

The first converted governance policies may be indicative of routing data governing the microservice operations of the service registry. The second converted governance policies may be indicative of routing data governing said further microservice instances of the service mesh.

In various embodiments, the controller may be integrated with the service registry. In other embodiments the controller may be integrated with the service mesh. In yet other embodiments, the controller may be separate from the service registry and the service mesh. In yet other embodiments, the controller may include multiple components which may include components integrated with the service registry, components integrated with the service mesh, components separate from the service registry and service mesh, or a combination thereof.

Embodiments of the present disclosure relate to a method implemented by a controller and as described above, a controller configured as described above, and a computer program product or computer readable medium comprising statements and instructions recorded thereon which, when executed by a controller, cause the controller to implement a method as described above. The controller may include a processor executing program instructions stored in memory and a network interface, or functionally equivalent electronic components.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIG. 6 is an example of pseudocode for converting the Service Registry routing data model to the Service Mesh data model.

FIG. 8 is an example of pseudocode for converting the Service Mesh routing data model to the Service Registry data model.

It will be noted that throughout the appended drawings, like features are identified by like reference numerals.

DETAILED DESCRIPTION

Embodiments of the present disclosure relate to an integration of service registry and service mesh technologies. A controller, referred to herein as a Sync controller, may operate to facilitate such integration by facilitating bidirectional cross-technology service discovery, bidirectional cross-technology governance policy discovery, or a combination thereof. The controller may translate information in both directions between information readable by a service registry and information readable by a service mesh. The controller may be implemented as a computing device, a functional aspect of a computing device, or the like.

Figure 1A:
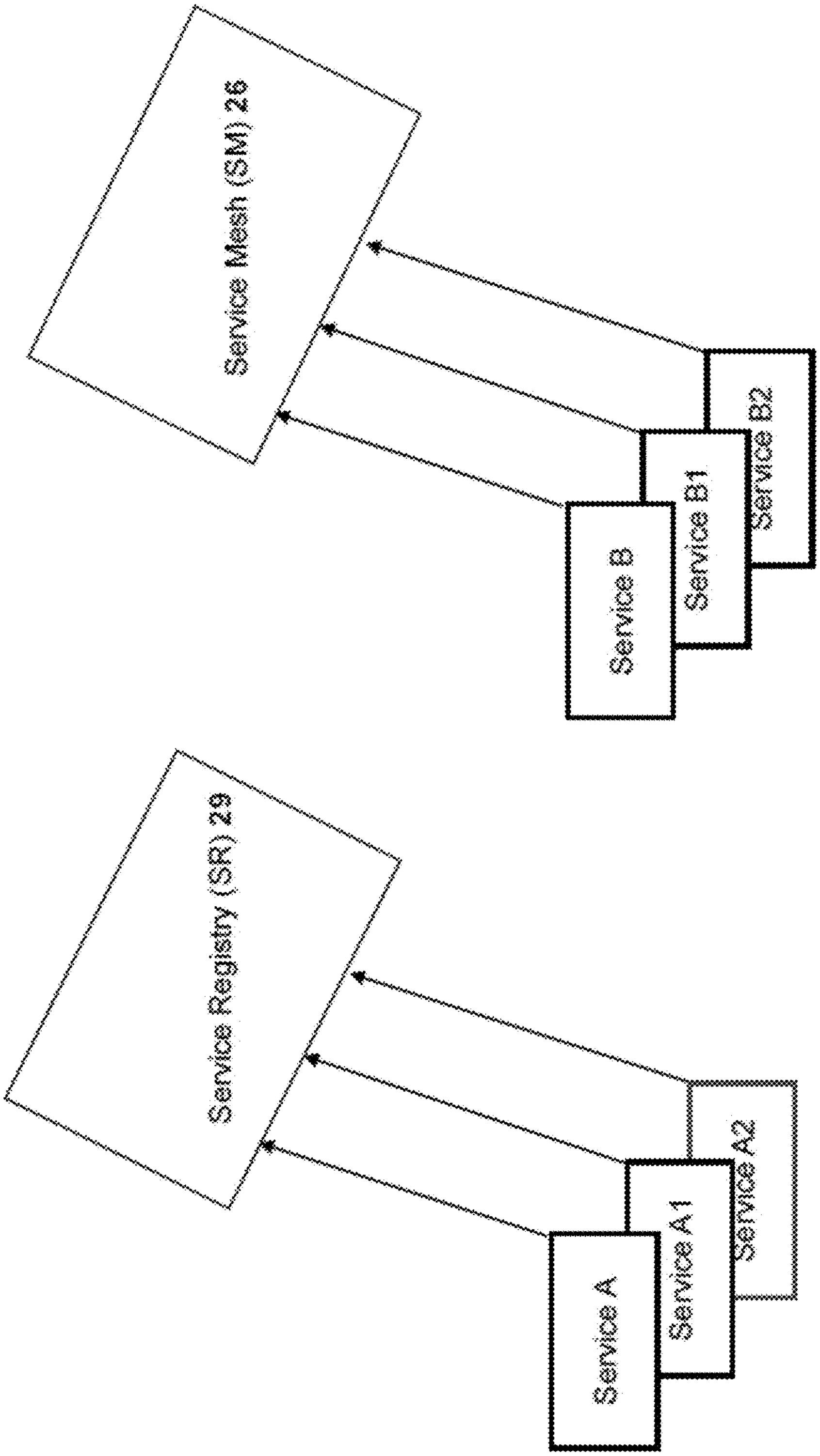
FIG. 1A is a general diagram showing a service registry (SR) with multiple associated services, and a service mesh (SM) with multiple associated.

The computing device may be virtualized in some embodiments. For context, FIG. 1A shows the service registry (SR) 29 with multiple associated services, including Service A, and the service mesh (SM) 26 with multiple services associated with it, including Service B. Operation of a SR 29 to facilitate access to and governance of services (microservices) such as services A, A1 and A2, can proceed at least in part as would be readily understood by a worker skilled in the art. Operation of a SM 26 to facilitate access to and governance of services such as services B, B1 and B2, can proceed at least in part as would be readily understood by a worker skilled in the art.

Figure 1B:
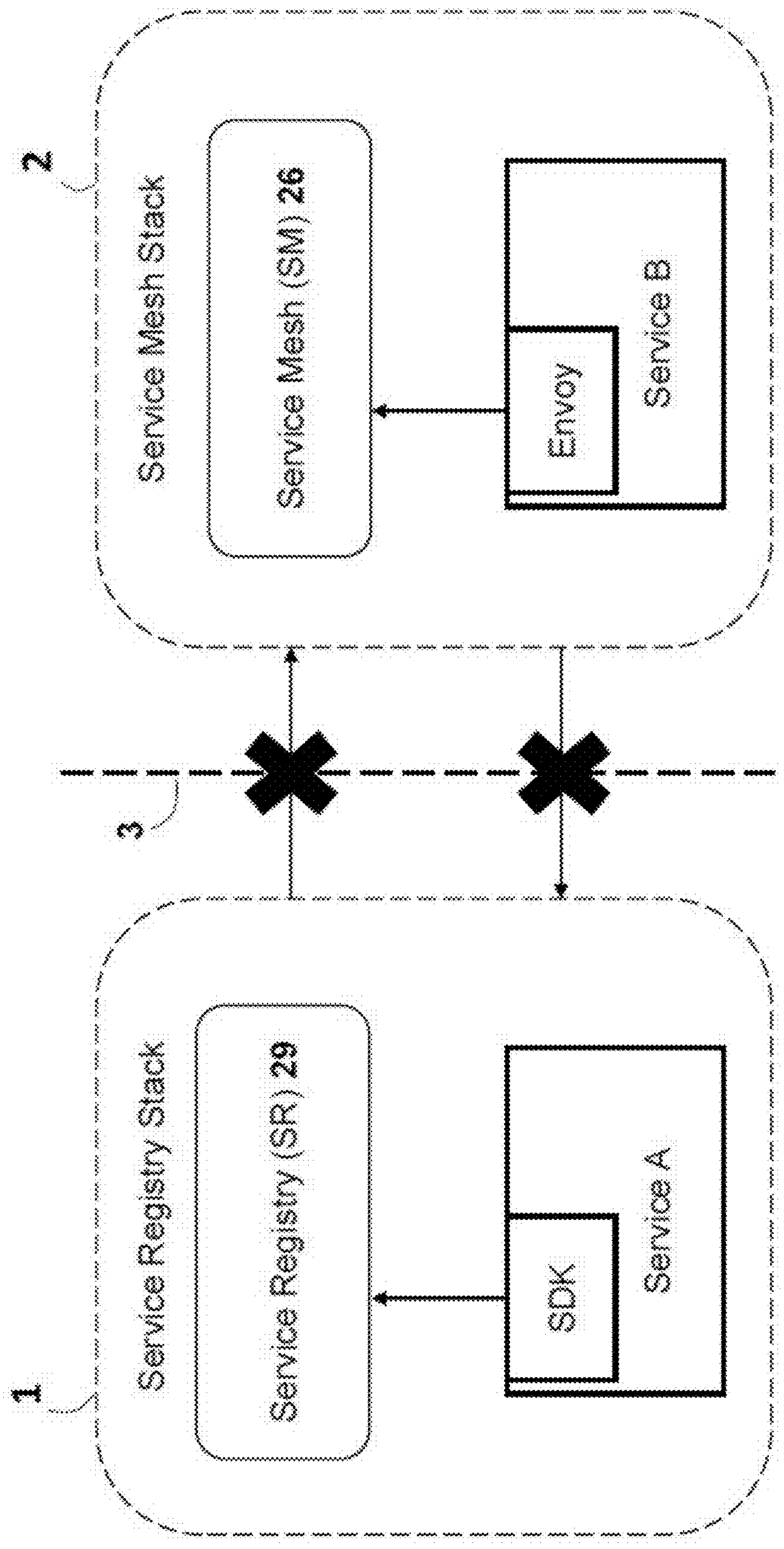
FIG. 1B is a block diagram showing an example of a communication barrier between microservices using a service registry stack and microservices using a service mesh stack.

For further context and motivation, FIG. 1B illustrates a block diagram of a service registry stack 1 and a service mesh stack 2 with a communication barrier 3 in between microservices handled by the respective stacks 1 and 2. Due to the communication barrier 3, and without additional measures being taken, microservices which are registered into the service registry (SR) 29 are not discoverable by the service mesh (SM) 26, and microservices which are registered into the SM 26 are not discoverable by the SR 29. Furthermore, governance policies, registered with the SM 26 are not synchronized to the SR 29, and governance policies registered with the SR 29 are not synchronized to the SM 26. Modernization of microservices applications via embodiments of the present disclosure involves removing, overcoming or mitigating the communication barrier 3 between the SR 29 and the SM 26.

A Sync Controller of the present disclosure may operate as a server for purposes of interacting with at least one external entity (e.g., the service mesh). Additionally, or alternatively the sync controller may operate as a client for purposes of interacting with at least one external entity. A client, such as the sync controller client may send requests to a server and wait for responses. A server, such as the sync controller server, will monitor for and respond to requests from an associated client.

Figure 2:
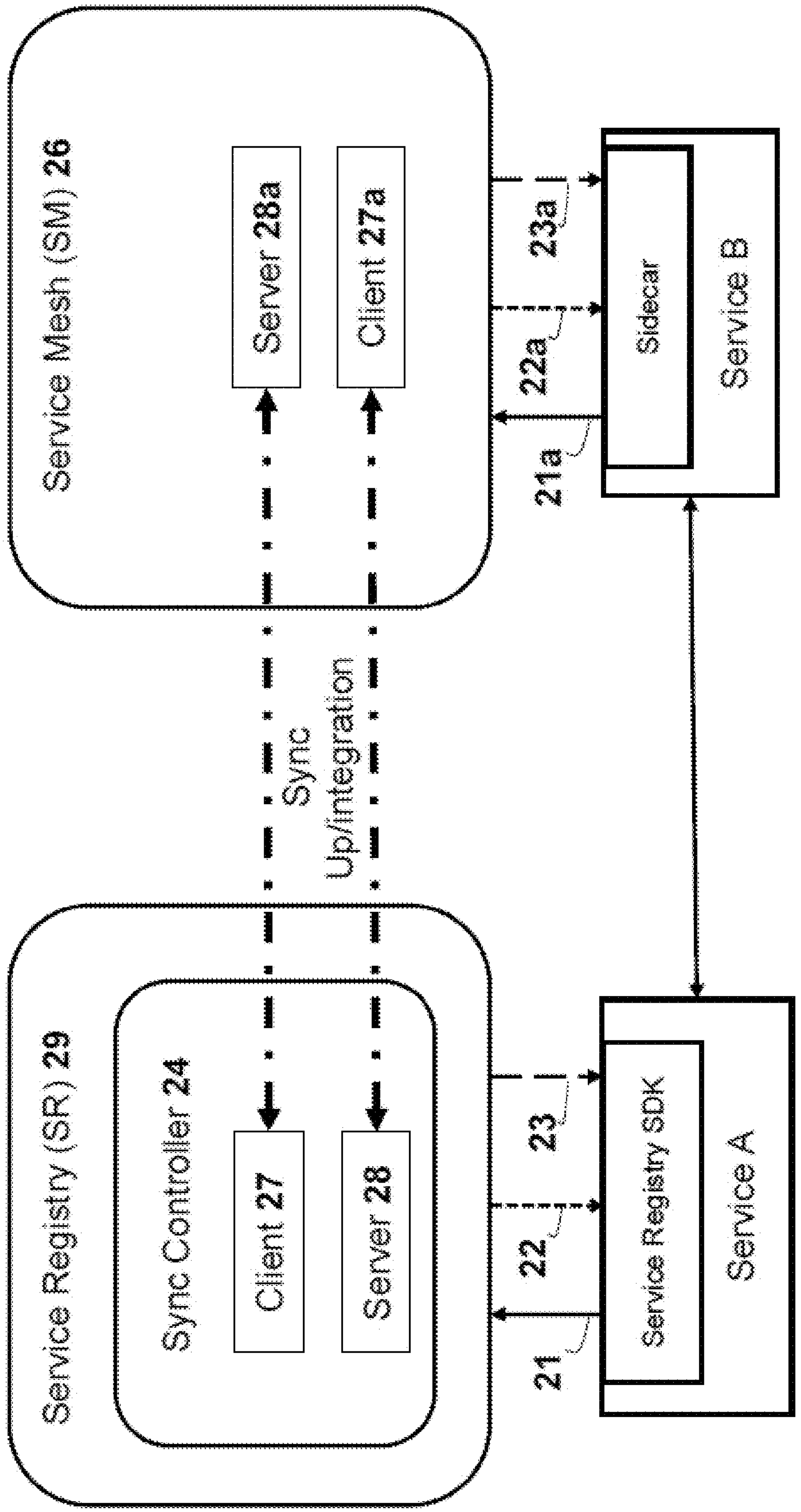
FIG. 2 shows a block diagram of a system according to embodiments of the present disclosure.

FIG. 2 is an overview drawing, introducing the architecture and interconnections of a system according to embodiments of the present disclosure. FIG. 2 illustrates a block diagram of the system implementing a Sync Controller 24 to handle connections with the SM 26. The Sync Controller 24 as illustrated is associated with (e.g. embedded in or integrated into) the SR 29. Alternatively, the Sync Controller 24 can also be a standalone device or functionality (transparently adding capabilities such as observability, and traffic management to the SR 29), or the Sync Controller 24 may be associated with the SM 26. As yet another alternative the Sync Controller 24 may include multiple parts, one or more of which may be integrated with the SM 26, the SR 29, or both. In the presently illustrated embodiment, a server 28 of the Sync Controller 24 may be synchronized with a client 27*a* at the SM 26. The server 28 may be at least in part an XDS-based server.

XDS tool is a mainstream service discovery protocol, used in synchronization of the control plane and data plane of the service mesh. The XDS protocol implemented for data synchronization between a service registry and a service mesh improves application solutions' development efficiency, and their versatility, allowing data synchronization with other data planes that support the XDS protocol. Leveraging XDS ability to perform an array of complex task, embodiments of the present disclosure can be readily implemented. For example, the Sync Controller 24 design effort may be alleviated by incorporating at least some elements of XDS protocol into the Sync Controller 24 structure including the server 28 and the client 27. XDS may be used to configure service mesh' sidecars.

A client 27 of the Sync Controller 24 may be synchronized or communicatively coupled with a server 28*a* of the SM 26. The client 27 may be at least in part an XDS-based client. Operations 21, 22, and 23 denote respectively communication of registration, governance, and discovery indicative information, exchanged between the SR 29 and the Services A. Operations 21*a*, 22*a*, and 23*a* denote respectively communication of registration, governance, and discovery indicative information, exchanged between the SM 26 and the Service B. The operations 21, 22, 23, 21*a*, 22*a*, and 23*a* arrows show the direction of information flow from or to the Services A and B, so that these services can be discovered and used in an appropriate manner. If the Sync Controller 24 is not associated with the SR 29, the client 27 and server 28 components may be adjusted to interoperate with corresponding client and server components of the SR 29 and SM 26 in an appropriate manner, as would be readily understood by a worker skilled in the art.

Figure 3:
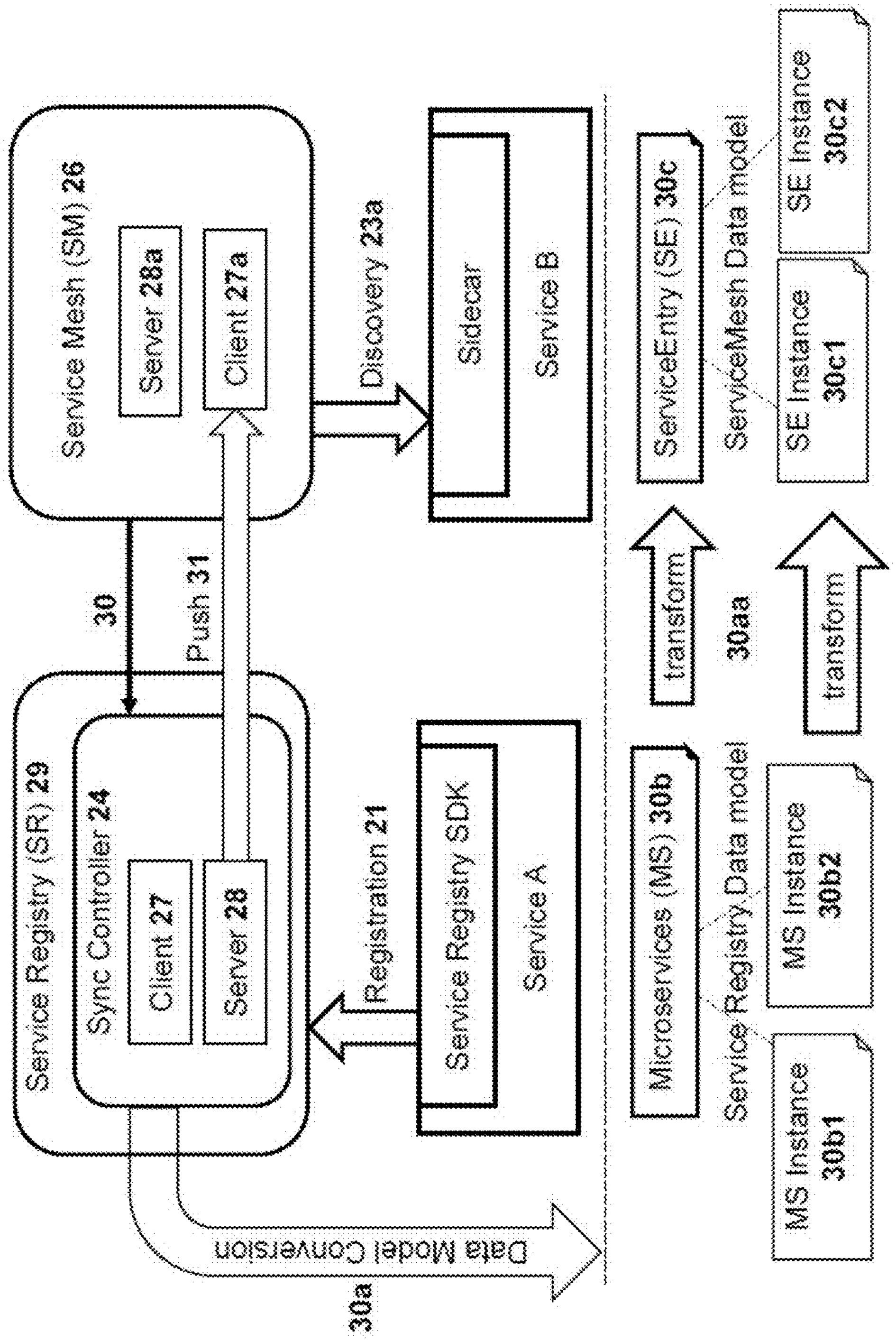
FIG. 3 is a block diagram showing a service mesh discovering service registry services, according to embodiments of the present disclosure.

FIG. 3 illustrates a block diagram of the Sync Controller 24 facilitating discovery, by the SM 26, of the SR 29 services. In response to receiving a discovery request 30 from the SM, the Sync Controller 24 may execute or initiate a data model conversion 30*a* converting the SR 39' service name and service locations (e.g., Microservice (MS) 30*b* and Microservice Instances 30*b*1-30*b*2) to Service Mesh data model (e.g., Service Entry (SE) 30*c* and Workload Entries/Instances 30*c*1-30*c*2). Converted data includes data in a format supported by the SM 26. The converted data is pushed 31 by the Sync Controller 24 to the SM 26.

In more details, the service mesh 26 is implemented using a scalable set of network proxies deployed alongside application code operative to provide microservice instances. The service mesh 26 may send a first discovery request 30 to the Sync Controller 24. The discovery request 30 may be sent from a client 27*a* of the Service Mesh 26 to a server 28 of the Sync Controller 24. The subsequent push 31 of converted data may be from the server 28 to the client 27*a*. Responsive to the first discovery request 30, the Sync Controller 24 may obtain registry data from the SR 29. The registry data is indicative of names and locations of services registered to the SR 29. The SR 29 includes a database populated with information indicative of how and where to dispatch service requests for fulfilment by certain microservice instances. Also, the registry data may include all registration metadata held in the SR 29 for the services, registered to the SR 29. The Sync Controller 24 may also apply the data model conversion 30*a* to convert the registry data, and consequently, provide converted data to the SM 26 as denoted in FIG. 3 by "push 31". The converted data includes the registry data in a format readable or supported by the SM 26.

The data model conversion 30*a* may involve one or more transformations 30*aa* of data. The transformations 30*aa* may operate to transform an entire data structure (indicative of a data model) or the contents of the data structure. For example, contents 30*b* indicative of microservices can be transformed into contents 30*c* indicative of equivalent service entries, the contents 30*c* provided in a different format than the contents 30*b*. Similarly, contents 30*b*1, 30*b*2 indicative of microservice instances may be transformed into contents 30*c*1, 30*c*2 in the different format than the contents 30*b*1, 30*b*2. It is noted that the contents 30*b*, 30*b*1, 30*b*2 may be initially generated due to registrations 21 of services to the SR 29. Discovery 23*a* may involve the SM 26 providing information to services thereof, following or in response to receiving information via the push 31. Such information may include information from the service registry 29, appropriately translated by the Sync Controller 24.

Here and elsewhere, conversion of information may be performed according to predetermined rules. The rules may specify how to convert information between formats for example by finding specified source data indicative of certain information, and populating destination data using that information. The information itself may be translated into a different format, moved to a differently formatted or located field, or the like, or a combination thereof.

Figure 4:
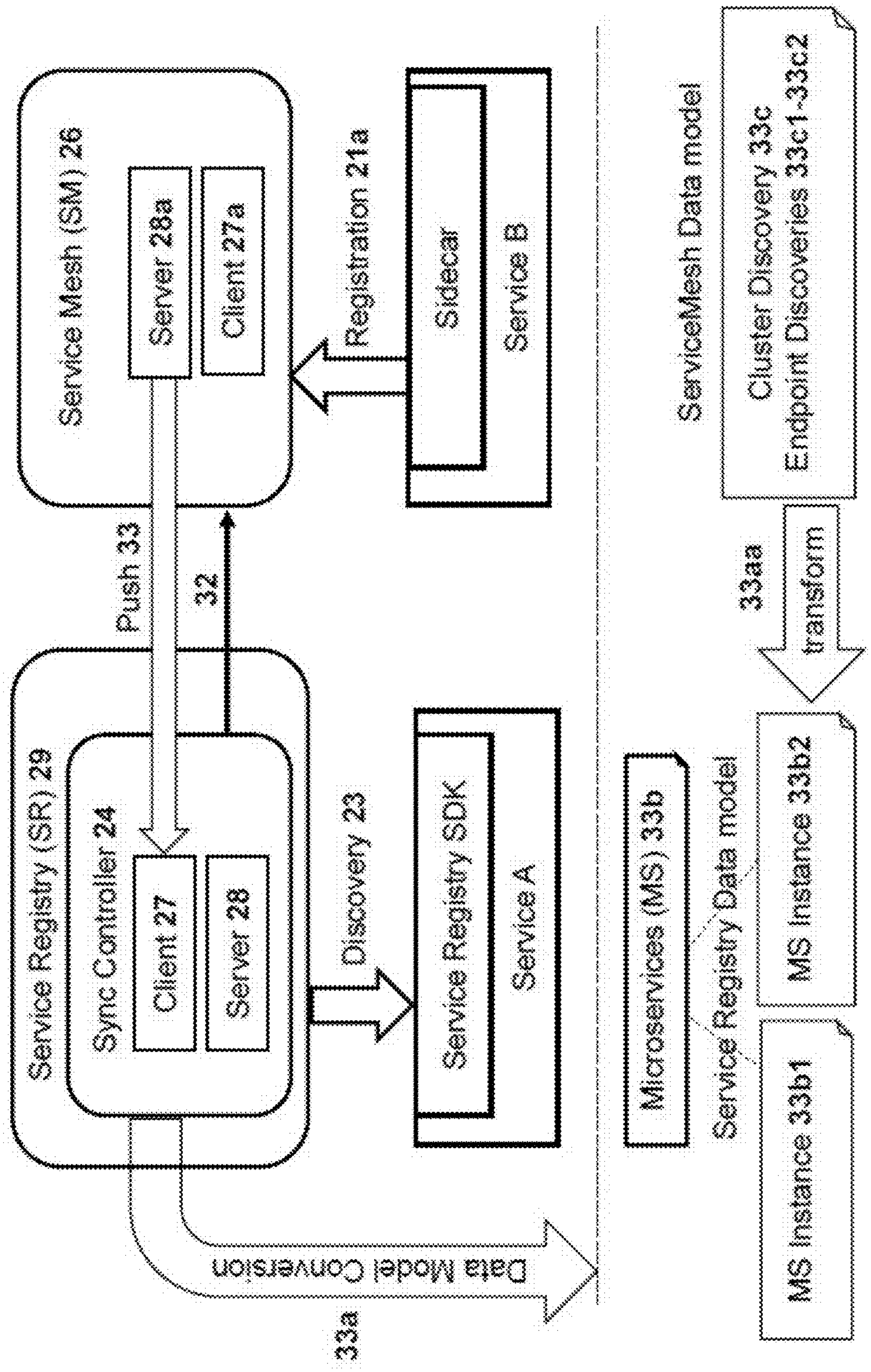
FIG. 4 is a block diagram showing a service registry discovering service mesh services, according to embodiments of the present disclosure.

FIG. 4 illustrates a block diagram of Sync Controller 24 facilitating discovery of the SM 26 services by the SR 29. The Sync Controller client 27, communicatively coupled to the SM 26, may send a second discovery request 32 to the SM 26. In response to the second discovery request 32, the SM 26 may push 33 to the Sync Controller 24 a response indicative of mesh data comprising further names and locations of services registered to the SM 26. The second discovery request 32 may be sent from a client 27 of the Sync Controller 24 to a server 28*a* of the Service Mesh 26. The subsequent push 33 (response indicative of mesh data) may be from the server 28*a* to the client 27. The Sync Controller 24 may apply a data model conversion 33*a* to convert the received service name and location data (e.g., Cluster Discovery 33*c* and Endpoint Discoveries 33*c*1-33*c*2) into the Service Registry's internal data model (e.g., Microservice (MS) 33*b* and Microservice instances 33*b*1-33*b*2).

Subsequently to receiving the response 33, the Sync Controller 24 may initiate an update to the SR 29 data store. The update may include second converted data, wherein the second converted data may include the mesh data in a format supported by the SR 29. The Sync Controller 24 may operate at least in part as an XDS-based synchronization client sending the second discovery request and receiving the response to the second discovery request. The Sync Controller 24 may repeatedly perform the described above operations of: sending the second discovery request 32, receiving the response (push 33) to the second discovery request 32, and initiating the update to the SR 29. The repetitions may occur periodically or in response to a trigger, so as to maintain up-to-date information in the service registry. Similar repetition may occur to maintain up-to-date information in the service mesh, for example by repeatedly obtaining data from the service registry, converting the data, and pushing the converted data to the service mesh. Also, the Sync Controller 24 may keep watching for changes in the SM 26.

The data model conversion 33*a* may involve one or more transformations 33*aa* of data. The transformations 33*aa* may operate to transform an entire data structure (indicative of a data model) or the contents of the data structure. For example, contents 33*c*, 33*c*1, 33*c*2 indicative of service entries in the service mesh data model can be transformed into contents 33*b*, 33*b*1, 33*b*2 indicative of equivalent service entries in the service registry data model, the contents 33*b*, 33*b*1, 33*b*2 provided in a different format than the contents 33*c*, 33*c*1, 33*c*2. It is noted that the contents 33*c*, 30*c*1, 30*c*2 may be initially generated due to registrations 21*a* of services to the SM 26, and may be related to cluster and endpoint discovery operations. Discovery 23 may involve the SR 29 providing information to services thereof, following or in response to receiving information via the push 33. Such information consequently includes information from the service mesh 26, appropriately translated by the Sync Controller 24.

The operations of FIGS. 3 and 4 may be combined to facilitate a bidirectional service discovery. The operations of FIG. 3 can be performed prior to, subsequently to, or concurrently with, the operations of FIG. 4.

Figure 5:
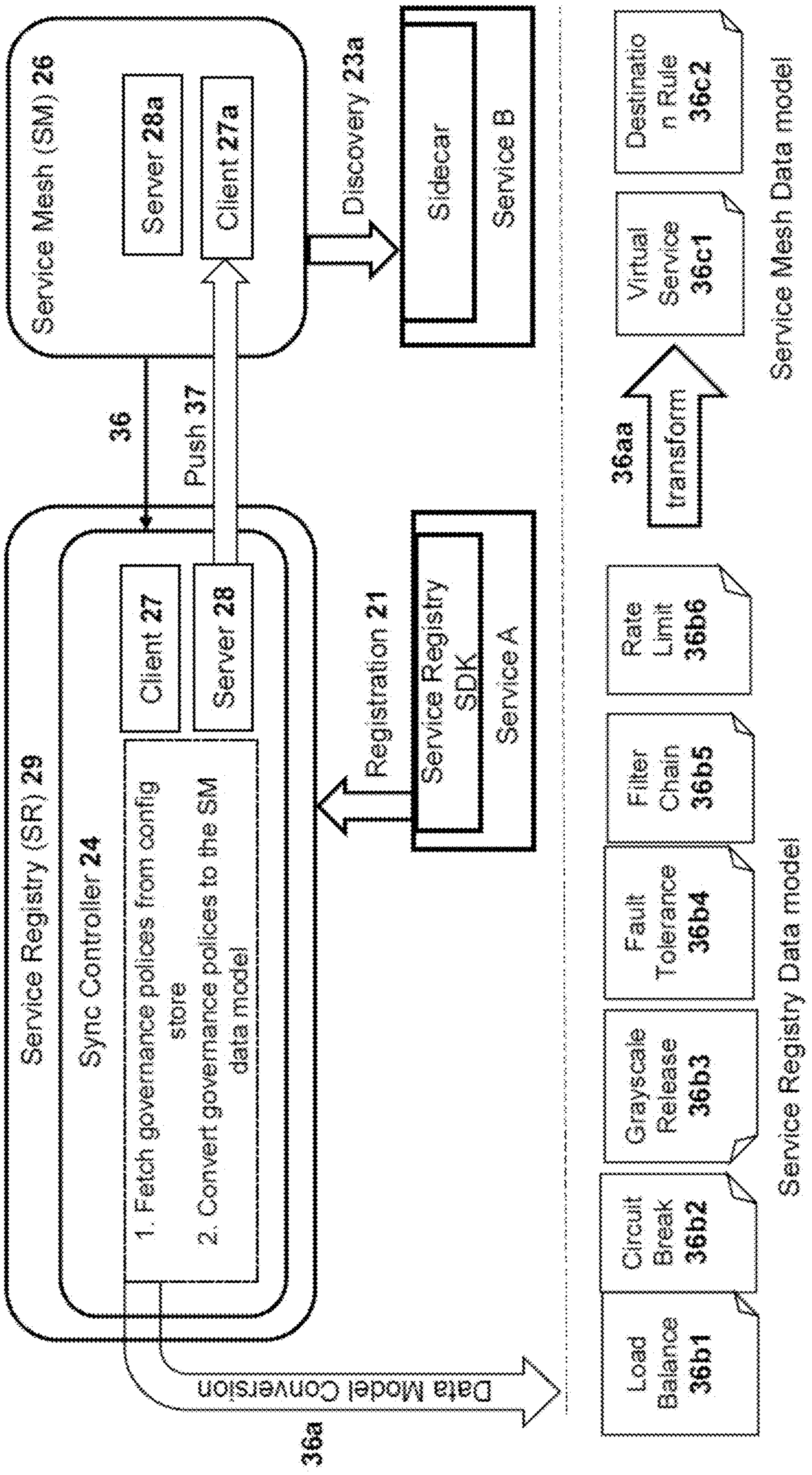
FIG. 5 is a block diagram showing the service registry synchronizing governance polices to the service registry, according to embodiments of the present disclosure.

FIG. 5 illustrates a block diagram of the Sync Controller 24 synchronizing governance polices from the SR 29 to the SM 26. Following the governance request 36 from the SM 26 (or otherwise without requiring such a request), the Sync Controller 24 may obtain first governance policies from the SR 29. The SR 29 includes a database populated with information indicative of how to dispatch service requests for fulfilment by microservice instances, for example, governance configurations 36*b*1-36*b*6. The first governance policies are indicative of microservice configurations stored by the SR 29 for use in governing microservice operations. The Sync Controller 24 may use or implement a data model conversion 36*a* to convert the SR 29' governance configurations 36*b*1-36*b*6 to the Service Mesh governance data model, for example including a Virtual Service 36*c*1 and a Destination Rule 36*c*2. Subsequently to the data model conversion 36*a*, the Sync Controller 24 may provide (push 37) the first converted governance policies to the SM 26. The first converted governance policies may comprise the first governance policies in a format readable or supported by the SM 26. For example, the format supported by the SM 26 may be a service mesh governance data model. The Sync Controller 24 may operate at least in part as an XDS-based server providing the first converted governance policies to the SM 26. Also, the first converted governance policies may be indicative of routing data governing said microservice operations of the service registry.

The governance request 36 may be sent from a client 27*a* of the Service Mesh 26 to a server 28 (e.g. XDS-based server) of the Sync Controller 24. The subsequent push 37 of converted governance policy data may be from the server 28 to the client 27*a*.

The data model conversion 36*a* may involve transforming 36*aa*, e.g. by the Sync Controller 24 or another device, service registry data model governance information into service mesh data model governance information. The service registry data model governance information can include some or all of: information on load balancing 36*b*1; circuit break information 36*b*2; greyscale release information 36*b*3, fault tolerance information 36*b*4, filter chain information 36*b*5, and rate limit information 36*b*6. The service mesh data model governance information may include virtual service information 36*c*1, and destination rule information 36*c*2. The 36*b*1-36*b*6 data models may be considered as specializations of the 36*c*1 and 36*c*2. The 36*b*1-36*b*6 data models, each may have a subset of fields of 36*c*1 and 36*c*2. For example, during transformation of the 36*b*1 into the 36*c*1 and 36*c*2, some of the 36*c* fields are kept blank while other may be filled out, for the 36*b*2 the filled out fields may be different the 36*b*1, and so on. The fields in both sides may have different names, and the equivalences are set based on the semantic of the fields, i.e., different names/formats but same meaning. In all the cases, each 36*b* data model will generates two structures—36*c*1 and 36*c*2 respectively, with different blank and filled out fields. Data model conversion may generally involve converting the manner in which relevant information is presented, for example with respect to format, naming, etc. Some information may be potentially discarded as part of data model conversion, if that information is not relevant in the output data model. Other data model conversions as described herein may operate similarly.

FIG. 6 shows an example of pseudocode for converting the Service Registry routing data model to the Service Mesh data model in some embodiments of the present disclosure. When the Sync Controller 24 receives a governance request 36 from the SM 26, conversion of the Service Registry routing data model to Service Mesh data model may include the following steps. If there are RouteRules in the SR 29 config store, the Sync Controller 24 may range RouteRules, decode a selected RouteRule, and get a Service Name from the selected RouteRule. If there is a Microservice with the same Service Name in the SR 29, the Sync Controller 24 may create a DestinationRule with this Service Name. Furthermore, the Sync Controller 24 may abstract service addresses, ports and versions from the Microservice (and its instances) constructing and insert destinations to the DestinationRule. The Sync Controller 24 may create a Virtual Service for each destination of the DestinationRule, and convert the weight in the DestinationRule to the weight in the VirtualService. If the RouteRule specifies a http header matching, the Sync Controller 24 will convert the http header matching section to the VirtualService' match.header section. If the RouteRule specifies instance version matching, the Sync Controller 24 will convert the version matching section to the VirtualService' subset section.

Figure 7:
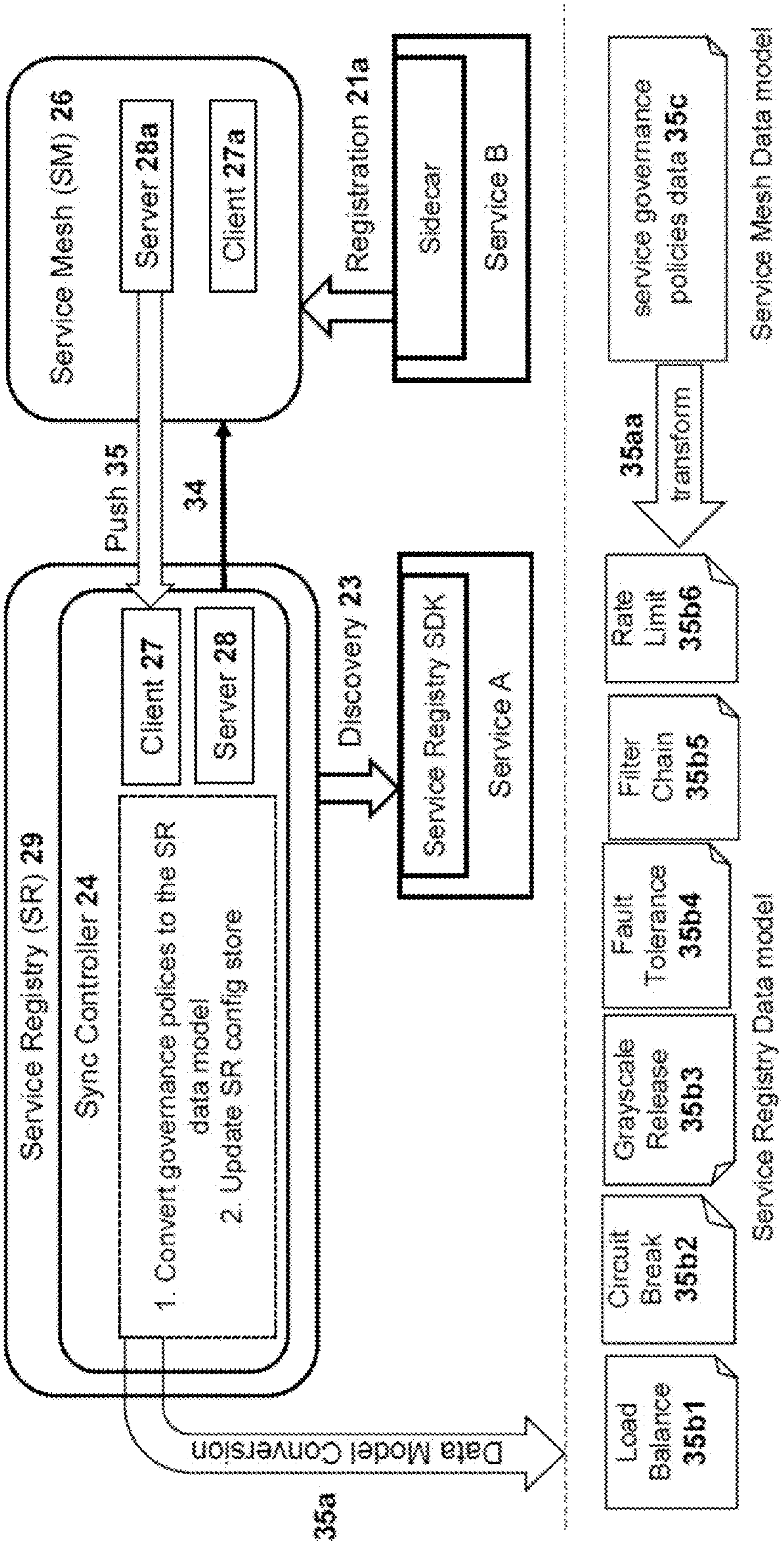
FIG. 7 is a block diagram showing the service mesh synchronizing governance polices to the service registry, according to embodiments of the present disclosure.

FIG. 7 shows a block diagram of the Sync Controller 24 synchronizing governance polices from the SM 26 to the SR 29. The Sync Controller 24 may send a request 34 (with governance polices) to Service Mesh 26. The governance policy request 34 may be a request for second governance policies held by the SM 26 for use in governing operations of the further microservice instances. The request 34 may be an XDS-based request. Following the request 34, the Sync Controller 24 may receive (push 35) a response to the governance policy request 34 from the SM 26. The response is indicative of the second governance policies. Subsequently to receiving the response 35, the Sync Controller 24 initiating an update to the SR 29. The update may include providing to the SR 29 second converted governance policies. The second converted governance policies may be indicative of routing data governing the further microservice instances of the SM 26. The second converted governance policies may include the second governance policies in a format supported by the SR 29. The Sync Controller 24 may analyze the response indicative of the second governance policies (the service governance policies data 35*c*) and generate mappings. The Sync Controller 24 may also apply the data model conversion 35*a* to convert the second governance policies 35*c* and mappings to the SR 29' internal representation 35*b*1-35*b*6. Subsequently, the Sync Controller 24 may update the SR config store and keep watching for changes on the SM 26. The Sync Controller 24 may repeatedly perform the operations of: sending the governance policy request, receiving the response to the governance policy request, and initiating the update to the SR 29. Also, the Sync Controller 24 may operate at least in part as an XDS-based synchronization client sending the governance policy request and receiving the response to the governance policy request.

The governance request 34 may be sent from a client 27 (e.g. XDS-based client) of the Sync Controller 24 to a server 28*a* of the Service Mesh 26. The subsequent push 35 of converted governance policy data may be from the server 28*a* to the client 27.

The data model conversion 35*a* may involve transforming 35*aa*, e.g. by the Sync Controller 24 or another device, service mesh data model governance information into service registry data model governance information. The service mesh data model governance information may include service governance policies data 35*c*. The service mesh data model governance information ma additionally or alternatively include virtual service information, destination rule information, etc. The service registry data model governance information can include some or all of: information on load balancing 35*b*1; circuit break information 35*b*2; greyscale release information 35*b*3, fault tolerance information 35*b*4, filter chain information 35*b*5, and rate limit information 35*b*6. The 35*b*1-35*b*6 are specialized transformations of the 35*c*. On a high level, the transformation 35*aa* may strip out blank/unused fields of the 35*c*, and use the remaining filled fields to create the 35*b*1-35*b*6. The fields names may not match in both structures, and their equivalence is defined based on their semantics, i.e., different names/structure but same meaning.

The operations of FIGS. 5 and 7 may be combined to facilitate a bidirectional service discovery. The operations of FIG. 5 can be performed prior to, subsequently to, or concurrently with, the operations of FIG. 7. The operations of FIGS. 3 and 5 may occur concurrently or at different times. The operations of FIGS. 4 and 7 may occur concurrently or at different times. The operations of one, some or all of FIGS. 3, 4, 5 and 7 may occur repeatedly, for example periodically or according to a schedule or repeated set of triggers. This allows up-to-date information to be maintained between the service mesh and service registry, so that microservices and details of each is provided to the other in a bidirectional, ongoing manner.

FIG. 8 shows an example of pseudocode for converting the Service Mesh routing data model to the Service Registry data model in some embodiments of the present disclosure. When the Sync Controller 24 sends a governance request 34, conversion may include the following steps. If there are RDS configurations in the response 35 from the SM 26, the Sync Controller 24 may filter out system default configurations by name and name space. The Sync Controller 24 may also range the RDS configurations, and decode a selected RDS config, generating a virtual host. The Sync Controller 24 may also extract a virtual host service name and service name space, and create a Service Registry RouteRule with this service name. If there is a routes.match configuration in the virtual host, the Sync Controller 24 may set the match configuration to the Service Registry RouteRule. The Sync Controller may also extract the route configs from the virtual host, and range the route configs. Furthermore, the Sync Controller 24 may extract service address, port, weight, and version from a selected route configuration, and construct a Route Configuration, setting it to the Service Registry RouteRule structure.

Figure 9:
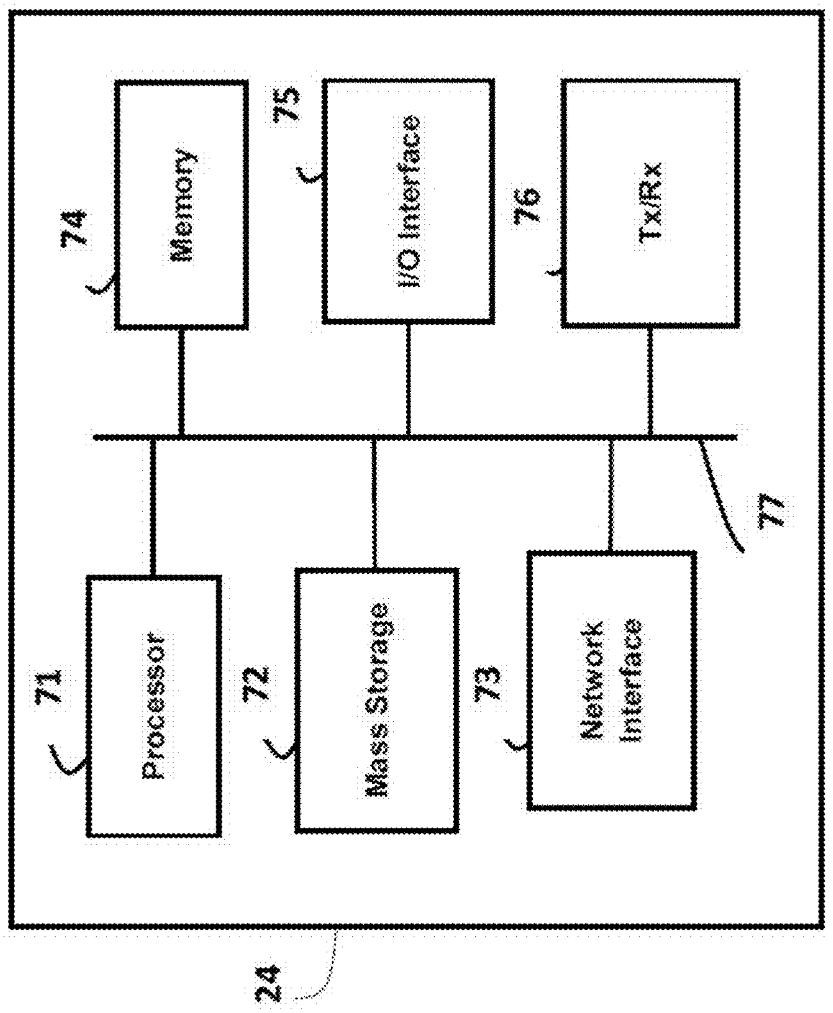
FIG. 9 is a block diagram of a controller, according to embodiments of the present disclosure.

FIG. 9 is a block diagram of an electronic device 24 which was denoted in the present disclosure as a controller. The controller may comprise a computer processor operatively coupled to a computer memory. A computer equipped with network function may be configured as a controller. The controller may correspond to parts of a computer server, for example in a datacenter, or a network node providing network access (e.g., a gNB).

As shown in FIG. 9, the device 24 includes a processor 71, such as a Central Processing Unit (CPU) or specialized processors such as a Graphics Processing Unit (GPU) or other such processor unit, memory 74, non-transitory mass storage 72, I/O interface 75, network interface 73, and a transceiver 76, all of which are communicatively coupled via bi-directional bus 77. According to certain embodiments, any or all of the depicted elements may be utilized, or only a subset of the elements. Further, the device 24 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 74 may include any type of non-transitory memory such as static random access memory (SRAM), dynamic random access memory (DRAM), synchronous DRAM (SDRAM), read-only memory (ROM), any combination of such, or the like. The mass storage element 72 may include any type of non-transitory storage device, such as a solid state drive, hard disk drive, a magnetic disk drive, an optical disk drive, USB drive, or any computer program product configured to store data and machine executable program code. According to certain embodiments, the memory 74 or mass storage 72 may have recorded thereon statements and instructions executable by the processor 71 for performing any of the aforementioned method operations described above.

It is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology. Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

The invention claimed is:

1. A method comprising, by a controller:

receiving a first discovery request from a service mesh, the service mesh implementable using a scalable set of network proxies deployed alongside application code operative to provide microservice instances;

obtaining registry data from a service registry, the registry data indicative of names and locations of services registered to the service registry, the service registry comprising a database populated with information indicative of how and where to dispatch service requests for fulfilment by further microservice instances;

in response to the first discovery request, providing converted data to the service mesh, the converted data comprising the registry data in a format readable by the service mesh;

sending a second discovery request to the service mesh;

receiving a response to the second discovery request from the service mesh, the response indicative of mesh data comprising further names and locations of services registered to the service mesh; and subsequently to receiving the response, initiating an update to the service registry, the update including providing, to the service registry, second converted data, the second converted data including the mesh data in a format readable by the service registry.

2. The method of claim 1, wherein the controller operates at least in part as an XDS-based server receiving the first discovery request and providing the converted data in response to the first discovery request.

3. The method of claim 1, wherein the controller operates at least in part as an XDS-based synchronization client sending the second discovery request and receiving the response to the second discovery request.

4. The method of claim 1, further comprising repeatedly performing said operations of: sending the second discovery request, receiving the response to the second discovery request, and initiating the update to the service registry.

5. The method of claim 1, further comprising converting the registry data to the converted data, converting the mesh data to the second converted data, or both.

6. The method of claim 1, wherein the registry data comprises all registration metadata held in the service registry for said services registered in the service registry.

7. A method comprising, by a controller:

obtaining first governance policies from a service registry, the first governance policies indicative of microservice configurations stored by the service registry for use in governing microservice operations, the service registry comprising a database populated with information indicative of how to dispatch service requests for fulfilment by microservice instances;

providing first converted governance policies to a service mesh, the first converted governance policies comprising the first governance policies in a format readable by the service mesh, the service mesh implemented using a scalable set of network proxies deployed alongside application code operative to provide further microservice instances;

sending a governance policy request to the service mesh, the governance policy request being a request for second governance policies held by the service mesh for use in governing operations of the further microservice instances;

receiving a response to the governance policy request from the service mesh, the response indicative of said second governance policies; and subsequently to receiving the response, initiating an update to the service registry, the update including providing, to the service registry, second converted governance policies to the service mesh, the second converted governance policies including the second governance policies in a format readable by the service registry.

8. The method of claim 7, wherein the format readable by the service mesh is a service mesh governance data model.

9. The method of claim 7, wherein the controller operates at least in part as an XDS-based server providing the first converted governance policies to the service mesh.

10. The method of claim 7, wherein the controller operates at least in part as an XDS-based synchronization client sending the governance policy request and receiving the response to the governance policy request.

11. The method of claim 7, further comprising repeatedly performing said operations of:

sending the governance policy request, receiving the response to the governance policy request, and initiating the update to the service registry.

12. The method of claim 7, further comprising:

converting the first governance policies from the service registry to the first converted governance policies readable by the service mesh, converting the second governance policies from the service mesh to the second converted governance policies readable by the service registry, or both.

13. The method of claim 7, wherein the first converted governance policies are indicative of routing data governing said microservice operations of the service registry.

14. The method of claim 7, wherein the second converted governance policies are indicative of routing data governing said further microservice instances of the service mesh.

15. A controller comprising a computer processor operatively coupled to a computer memory and configured to perform the method of claim 1.

* * * * *